United States Patent [19]

Dufrancatel

[11] Patent Number: 5,029,935
[45] Date of Patent: Jul. 9, 1991

[54] ARRANGEMENT FOR A PIECE OF FURNITURE IN A CONSTRUCTION AND VEHICLE, SUCH AS CARAVAN COMPRISING A MOVABLE PIECE OF FURNITURE

[75] Inventor: Michel Dufrancatel, Mont Saint Aignan, France

[73] Assignee: Esterel International SA, France

[21] Appl. No.: 404,761

[22] Filed: Sep. 8, 1989

[30] Foreign Application Priority Data

Sep. 9, 1988 [FR] France ............................ 8811800

[51] Int. Cl.$^5$ .............................................. B60P 3/32
[52] U.S. Cl. .................................. 296/156; 126/37 B; 126/276; 312/266
[58] Field of Search ..................... 296/156, 165, 24.1; 224/282, 42.01, 42.44, 42.45 R; 126/37 B, 268, 276; 248/281.1; 312/266, 269

[56] References Cited

U.S. PATENT DOCUMENTS

| 1,370,672 | 3/1921 | Sawyer | 296/156 |
| 2,867,471 | 1/1959 | Coon Jr. | 296/156 |
| 3,406,999 | 10/1968 | Kozicki | 296/156 |
| 3,692,351 | 9/1972 | Christopher et al. | 296/156 |
| 3,888,539 | 6/1975 | Niessner | 296/156 |
| 3,912,324 | 10/1975 | Troyer | 296/156 |
| 4,089,554 | 5/1978 | Myers | 296/24.1 |
| 4,150,861 | 4/1979 | Dufrancatel | 312/266 |
| 4,396,222 | 8/1983 | Dufrancatel | 296/165 |

FOREIGN PATENT DOCUMENTS

| 0008978 | 8/1979 | European Pat. Off. . |
| 1893408 | 5/1964 | Fed. Rep. of Germany . |
| 2904113 | 8/1980 | Fed. Rep. of Germany ...... 296/156 |
| 8104005 | 11/1981 | Fed. Rep. of Germany . |
| 2513098 | 3/1983 | France . |

Primary Examiner—Dennis H. Pedder
Assistant Examiner—Andrew C. Pike

[57] ABSTRACT

An arrangement for shifting a piece of furniture through an opening in a vertical partition, such as a wall of a vehicle includes a linkage system which maintains the orientation of the piece of furniture as it is moved between two extreme positions, wherein one of the positions is offset to be lower than the other position. When incorporated in a vehicle, the lateral offset between the two extreme positions is approximately equal to the height of the floor of the vehicle above a ground surface so that if the piece of furniture is a kitchen unit, such as a stove, its working surfaces will be at the same height for use inside the vehicle as when used in the outer position outside the vehicle.

24 Claims, 5 Drawing Sheets

ARRANGEMENT FOR A PIECE OF FURNITURE IN A CONSTRUCTION AND VEHICLE, SUCH AS CARAVAN COMPRISING A MOVABLE PIECE OF FURNITURE

FIELD OF THE INVENTION

The invention relates firstly to an arrangement for a piece of furniture in a construction and then to the particular application to a vehicle such as a caravan.

PRIOR ART

Different variants of embodiment are already known of an arrangement for a piece of furniture in a construction comprising at least one essentially vertical partition with an opening for the piece of furniture to pass through, this piece of furniture being in either of the two extreme positions respectively on one side and on the other side of the partition and being able to be moved from one to the other of its two positions by means of an applied actuation force, which causes its movement, and mechanical means of support and guidance. For example, a piece of furniture such as a horizontal shelf is mounted so as to be movable or even to slide horizontally perpendicularly to the partition. In the case where the levels of the floor on either side of the partition are different—one higher, the other lower—it follows that the piece of furniture will not be at a height which is convenient for use in both of the possible positions. If the height is convenient in one position, it will thus clearly be too high or too low in the other position.

Such a situation is encountered in the case of a vehicle such as a caravan, the floor of which is raised in relation to the ground outside the caravan. Even though in such a case it might be desired to be able to use a kitchen unit on the inside or the outside of the caravan, the kitchen unit being positioned respectively on the inside or on the outside, it has in general until now proved impossible, given that the height of the floor of the caravan in relation to the ground is large, and is in the range of approximately 50 cm.

In another connection, arrangements are known for pieces of furniture which can be moved between two extreme positions, in caravans also, in particular collapsible rigid caravans. For example, the document U.S. Pat. No. 4,396,222 described a collapsible rigid caravan with an internal arrangement for furniture, one piece of which can be moved between a high position for use and a low position for stowing and non-use. The document DE 1 893 408 describes a non-collapsible rigid caravan, which comprises a container mounted on a flap, which pivots between two positions, one of which is for storage and one for use. The document U.S. Pat. No. 4,150,861 describes a piece of camping furniture with a fixed substructure and a movable piece supported by connecting rods which are articulated to it as well as to the substructure.

As far as the state of the art is concerned, reference can be made to the documents EP 0 008 978, U.S. Pat. No. 4,150,861, FR 2 513 098, U.S. Pat. No. 3,406,999 and DE 81 04005.

SUMMARY OF THE INVENTION

The object of the invention is to solve the principal technical problem of the possibility of using a piece of furniture (in accordance with the accepted definition in the text) in either of two extreme positions in which it can be positioned, on either side of a partition, when positioned on the side of the partition where the piece of furniture is located, with different references (such as support surface, ground, etc.) for each of the two positions.

In this case, a piece of furniture is understood to be a movable functional object such as a functional furniture element for arrangement in a habitation (table, shelf, work surface, cooking plate, sink, etc.) or any other functional or utility and even decorative object (tool, etc.).

The object of the invention is also to solve the subsidiary technical problem, which stems from the principal technical problem, of the possibility of substantially sealing the opening of the partition which permits the piece of furniture to pass through, whatever the position of the latter.

To this end and according to a certain aspect, the invention relates to an arrangement of a piece of furniture in a construction comprising at least one essentially vertical partition with an opening for the piece of furniture to pass through, this piece of furniture being in either of the two extreme positions respectively on one side and on the other side of the partition and being able to be moved from one to the other of its two positions by means of an applied actuation force, which causes its movement, and mechanical means of support and guidance, wherein the extreme positions of the piece of furniture are on the one hand situated close to the partition and on the other are offset in relation to one another along the latter.

According to a particular application, the partition forms part of a vehicle or habitation such as a caravan, which is also provided with a floor which forms a high internal support area, which is supported by wheels or supports resting on the ground, which forms a low external support area. A spacing H between the two extreme positions of the piece of furniture in a vertical direction is substantially equal to or close to the height H of the floor in relation to the ground, so that the piece of furniture is at the same relative height for a user in its two extreme positions.

According to another aspect, the invention relates to a vehicle, in particular one which serves as a habitation, such as a caravan, camping vehicle, mobile home, truck or trailer used as a shop or equivalent, fixed or movable, which vehicle comprises a floor which is raised in relation to the ground and is supported by supports such as wheels, props or equivalent means, as well as partitions delimiting the habitation, and which is provided with a functional furniture arrangement comprising in general a plurality of pieces of furniture of which at least one, or part of one, is in either of the two extreme positions. One of the positions is a high internal use position close to an essentially vertical partition, and the piece or part can be moved from the one to the other of these two extreme positions, while remaining constantly at least substantially in a relative horizontal position, by means of an applied actuation force, which causes its movement, and mechanical means of support and guidance, wherein the two extreme positions of the piece of furniture are the high internal position for use and a low external position also for use. The low external position is close to the partition and on the opposite side of the partition from the high internal position. The two positions are offset in relation to one another in the vertical direction with a spacing H which is substantially equal to or close to the height H of the floor in relation to the ground. The partition has an opening for the piece of furniture to pass through from one to the other of its extreme positions. Thus, the piece of furniture can be used from the inside or the outside of the vehicle, according to whether it is in a high internal position or a low external position respectively, while being at a substantially equal relative height of use for the user in both cases. This piece of furniture is preferably a kitchen unit. The opening of the partition is capable of being sealed by at least one movable flap, in particular two flaps which are high and low respectively, independent of one another and coplanar in a closed position. The high and low flaps have respective heights such that, in a closed position, their free contiguous edges are situated adjacent and above the upper surface of the piece of furniture, which is in the low position, in particular at least substantially coplanar with the upper horizontal wall of the substructure. Thus, if the piece of furniture is in the low external position, the high flap can be brought into the closed position without interfering with the piece of furniture or the connecting rods, while substantially closing the opening of the partition.

The invention is applicable to fixed or movable constructions (caravans, camping vehicles, etc.) or those capable of being moved (mobile homes), rigid or not, collapsible or not.

A preferred application, the subject of the detailed description, is that of a caravan and of a piece of furniture consisting of a kitchen unit or equivalent.

BRIEF DESCRIPTION OF THE DRAWINGS

The other characteristics and advantages of the invention are explained in the description below, with reference to the attached drawings, in which.

DESCRIPTION OF THE PREFERRED EMBODIMENT

The invention relates generally to an arrangement for a piece of furniture 1, (in the above accepted general definition), in a construction 2, fixed or movable, rigid or not, comprising at least one essentially vertical partition 3 with an opening 4 made in it for the piece of furniture 1 to pass through.

The piece of furniture 1 may be in either of the two extreme positions respectively on one side and on the other side of the partition 3. One of these positions is called internal and the other external. The piece of furniture 1 can be moved from one to the other of these two extreme positions by means of an actuation force applied to the piece of furniture 1 and mechanical means 5 of support and guidance.

The piece of furniture 1 can have the function, the shape, and the structure which stem from the accepted general definition given above. In the particular application, which is non-restrictive, it has a general monobloc shape limited by a flat parallelepipedal contour with a large surface which is at least substantially horizontal. However, other shapes can be envisaged.

The qualificatives "vertical", "horizontal" refer to the arrangement, to the piece of furniture, to the construction and in particular to the vehicle, in its most usual use position. However, these same elements can essentially be in a different absolute position, in particular when the difference is slight, without this affecting the invention substantially.

In a particular application, as will be seen below, the construction is a vehicle serving as a habitation, such as a caravan or equivalent.

The partition 3 is understood to be a wall which is essentially rigid and continuous in its entirety, in particular thin and overall plane, such as the partitions or walls currently used in fixed or movable constructions. In particular, the partition 3 is a panel which forms part of a caravan or equivalent. It could be conceived that generally there would be no partition 3, the absence of a partition 3 having the effect of making the passageway necessary for the piece of furniture 1. However, it would then be necessary for the construction 2 to be formed by any other element or solid structure, in particular to which the means 5 can be rigidly linked. Moreover, the existence of such a partition 3 makes it possible on the one hand to represent physically or pinpoint the two extreme positions, in particular internal and external, of the piece of furniture 1, and on the other hand to divide the space into an internal space 6 and an external space 7, respectively, in which the piece of furniture 1 can be in its two extreme positions and a user of the said piece of furniture 1 can also be, the spaces 6, 7 having different references (such as support surface).

The partition 3 is essentially vertical, that is to say that it has a general vertical direction, which does not exclude it having a slight overall inclination or more pronounced inclinations locally if this partition has an uneven shape.

The partition 3 comprises two opposite faces which are, respectively, internal 8 and external 9, on the side of the internal space 6 and the external space 7, respectively.

The opening 4 is limited by edges 10a and 10b of the partition. This opening 4 is sufficiently large (that is to say the facing edges are sufficiently far apart) to allow the piece of furniture 1 to pass through (and the means 5) from one to the other of the two extreme positions.

According to the invention, the two positions, internal and external respectively, of the piece of furniture 1 are both positions for the functional use of the piece of furniture 1 by a user who is normally in the internal space 6 or the external space 7, in which the piece of furniture 1 is at the time. These two positions are stable and can remain lasting for the time desired by the user. Between these two extreme positions, the piece of furniture 1 can, during its movement, be in an infinite number of successive passage positions.

The actuation force for moving the piece of furniture 1 from one to the other of its extreme positions is in particular a manual force applied directly or indirectly to the piece of furniture 1, in particular applied to the means 5.

The means 5 are linked to the partition 3, directly or indirectly, or more generally to the structure of the construction 2, and linked to the piece of furniture 1.

These means 5 comprise in general connecting rods, rods, arms, pivots, hinges, slide rails, slides, etc.

According to the invention, the extreme positions of the piece of furniture are on the one hand situated close to the partition 3 and, on the other, are offset in relation to one another along the latter. In particular, the extreme positions are respectively against or substantially against, respectively, the partition 3 on the internal face 8 and the external face 9.

By positions offset in relation to one another along the partition it is to be understood that the two positions are not facing (or symmetrical with) one another in relation to the partition 3. In relation to such an intermediate position which is facing (or symmetrical with) a starting position, the final position is brought about by sliding along the partition 3.

Thus, in the particular application case of a caravan or equivalent, one extreme position, in particular internal, is high and the other, in particular external, is low, the qualificatives "high" and "low" having to be understood in a relative manner, which means in this case that the two positions are at different levels.

Preferably, the mechanical means 5 of support and guidance comprise at least one connecting rod 19, 20 articulated on the one hand to the partition 3, directly or not, and, on the other hand, to the piece of furniture 1. A possible embodiment of these means 5 will be given in detail later.

Preferably,.the means 5 are also capable of ensuring a constant relative orientation of the piece of furniture 1 in relation to a reference direction. This reference direction is orthogonal to the direction of articulation of the connecting rod 19, 20 of the means 5 to the partition 3 and to the piece of furniture 1. In the particular application case of a caravan or equivalent, which is represented in the drawings, this reference direction is vertical or substantially vertical and the piece of furniture 1 is horizontal or substantially horizontal in its two extreme positions and in its intermediate positions, which has the effect of avoiding the overturning of the piece of furniture 1. In this case, the axes of articulation of the connecting rods of the means 5 are at least substantially horizontal.

In other application cases, the reference direction can be horizontal, the axes of the connecting rods of the means 5 being vertical.

The mechanical means capable of ensuring a constant relative orientation of the piece of furniture 1 in relation to a reference direction form part of the mechanical means 5 of support and guidance, which comprise to this end at least two connecting rods 19, 20, which are articulated on the one hand to the partition 3 and on the other to the piece of furniture 1, constituting a deformable parallelogram 21, 22, 23, 24. Preferably, two pairs of connecting rods 19, 20 are provided, which are separated transversely from one another along their common axes of articulation 21, 22, 23, 24.

The arrangement also comprises manual gripping means 11 which make it possible to apply the actuation force to move the piece of furniture 1. These means 11 comprise, for example, a handle 12 linked to a connecting rod of the means 5. For example, the handle 12 forms part of a U-shaped frame 13 connecting the two pairs of connecting rods 19, 20 of the means 5. Furthermore, the manual gripping means 11 are preferably arranged to form a lever in such a manner that moving the piece of furniture 1 is made easier.

Figure 3:
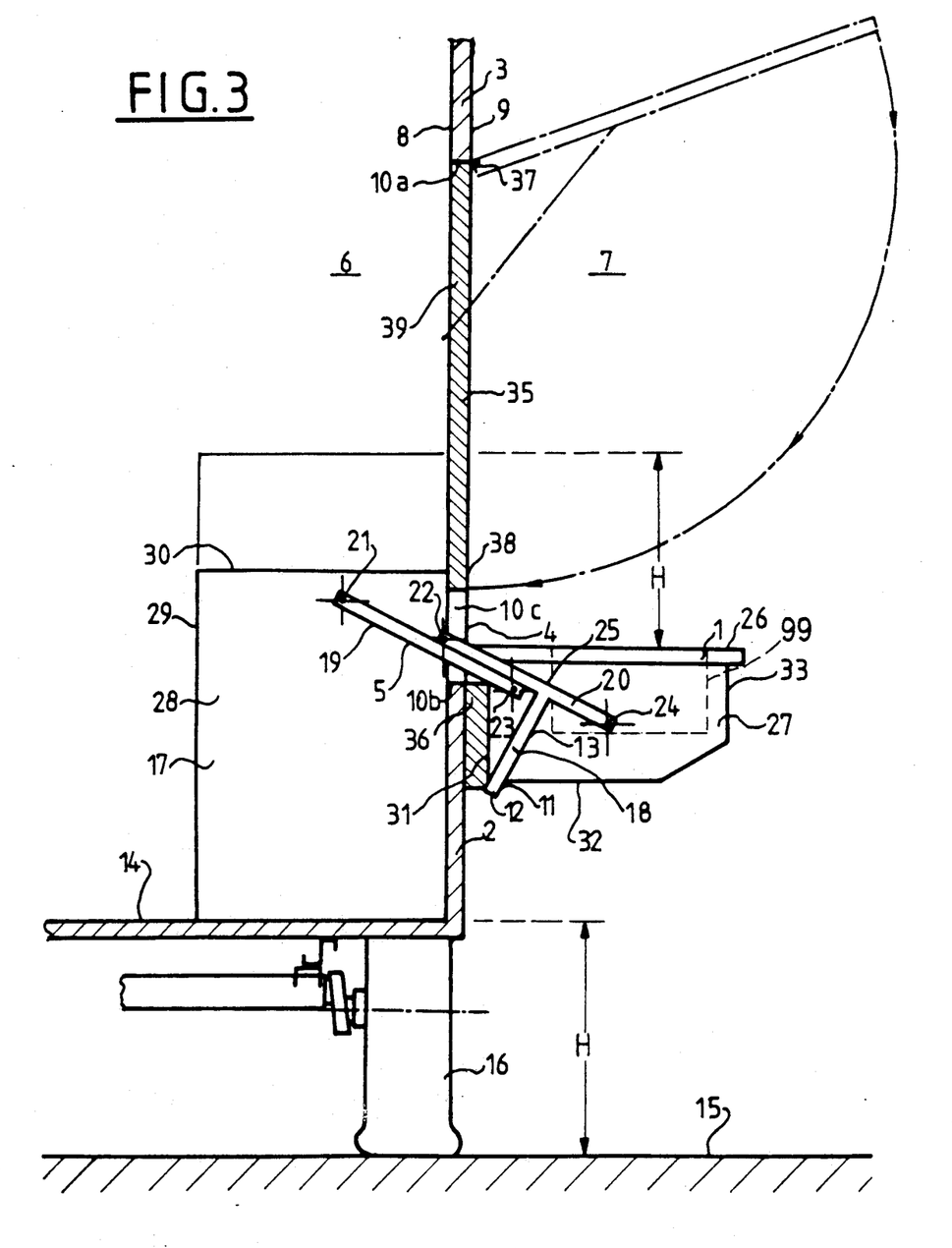
FIG. 3 is a view of the same type as those in FIGS. 1 and 2 with the piece of furniture in a low external position and the opening of the partition substantially closed.

Referring to the case (such as that of a caravan) in which the reference direction is vertical, the axes of the connecting rods of the means 5 horizontal, and the extreme positions high and low respectively, the partition 3 separates, preferably, two support areas, which are at least substantially horizontal and at different levels, one being a high level or area 14 and the other being a low level or area 15. The extreme positions of the piece of furniture 1 are respectively high level and low on the side of the high 14 and low level 15, and the vertical spacings H (FIG. 3) between the two support areas 14, 15 and the two extreme positions of the piece of furniture 1 are substantially equal or close thereto.

As results from the above, a possible, but non-restrictive, application of the arrangement for the piece of furniture 1 which has just been described is that of a vehicle such as a caravan (the case represented in the figures).

In this case, the partition 3 forms part of a vehicle or a habitation 2 such as a caravan, which is also provided with a floor which forms a high internal support area 14, which is supported by wheels or supports 16 resting on the ground, which forms a low external support area 15, the spacing H between the two extreme positions of the piece of furniture 1 in a vertical direction being substantially equal to or close to the height H of the floor 14 in relation to the ground 15, the effect of which is that the piece of furniture 1 is at the same relative height for a user in its two extreme positions.

The invention ther relates, and as a particular application, to a vehicle, in particular serving as a habitation, such as a caravan, camping vehicle, mobile home, truck or trailer used as a shop or equivalent, fixed or movable, which comprises a floor 14 which is raised in relation to the ground 15 and supported by supports 16 such as wheels, props, or equivalent, as well as partitions delimiting the habitation, and which is provided with a functional furniture arrangement comprising in general a plurality of pieces 1 and 17 of furniture of which at least one 1, or part of one, is in either of the two extreme positions, of which one is a high internal use position close to an essentially vertical partition 3, and can be moved from one to the other of these two extreme positions, while remaining constantly at least substantially in a relative horizontal position, by means of an applied actuation force, which causes its movement, and mechanical means 5 of support and guidance.

In such a vehicle, the two extreme positions of the piece of furniture 1 are the high internal position for use and a low external position also for use, which latter position is close to the partition 3 and on the opposite side of the latter from the high internal position, the two positions being offset in relation to one another in a vertical direction with a spacing H which is substantially equal to or close to the height H of the floor 14 in relation to the ground 15; the partition 3 comprising an opening 4 for the piece of furniture 1 to pass through from one to the other of its extreme positions; the effect of which is that the piece of furniture 1 can be used on the inside or the outside of the vehicle 2, according to whether it is in a high internal position or a low external position respectively, while being at a substantially equal relative height of use for the user in both cases.

The piece of furniture 1 is, for example, a kitchen unit or part of a kitchen unit.

In this case, the piece of furniture 1 may be, in relation to the respective support surface 14, 15 on which it is located, at a height in the region of approximately 90 cm, and since the floor 14 is at a height from the ground of in the region of 50 cm, the two positions, high and low, have a vertical separation of in the region of 50 cm also.

As results from that which has already been mentioned, the mechanical means 5 of support and guidance comprise at least one connecting rod 19, 20 articulated on the one hand to a substructure 17 fixed to the partition 3, and on the other hand to the piece of furniture 1, about axes which are at least substantially horizontal. Preferably, the mechanical means 5 of support and guidance comprise at least two connecting rods 19, 20 constituting a deformable parallelogram 21, 22, 23, 24, and comprise at lest one pair of connecting rods which are separated transversely from one another along their common axes of articulation. Furthermore, there are linked to the mechanical means 5 of support and guidance manual gripping means 11, which make it possible to apply the actuation force to move the piece of furniture 1 and which are constituted by a handle 12 forming the central part of a U-shaped frame 13, the two branches 18 of which are fixed rigidly to two connecting rods of the means 5.

Reference is now made to the figures in which the means 5 and 11 are represented. These means 5 and 11 comprise two front connecting rods 19, which are separated transversely from one another, and two rear connecting rods 20, which are separated transversely from one another, which rods are articulated to the substructure 17 about lower front axes 21 and lower rear axes 22 respectively and to the piece of furniture 1 about upper front axes 23 and upper rear axes 24, the axes 22, 21, 23, 24 constituting a deformable parallelogram; the lower front axis 21 being positioned at a higher level than the lower rear axis 22; the lower rear axis 22 being situated immediately next to the partition 3; the connecting rods 19, 20 being inclined at approximately 45° in the extreme positions of the piece of furniture 1; the U-shaped frame 13 being fixed by its branches 18 to the rear connecting rods 20, substantially perpendicularly to the latter and substantially in the centre of the latter; the handle 12 forming the central part of the U-shaped frame 13, in the high internal position of the piece of furniture 1 being situated close to the partition 3, behind and close to the piece of furniture 1, at least substantially at the same level as the upper rear axis 24, and in the low external position of the piece of furniture 1 being situated close to the partition 3, below and close to the piece of furniture 1.

The piece of furniture 1, which forms a kitchen unit which has a general parallelepipedal and relatively flat shape, comprises an upper surface 26 and, rigidly fixed and directed downwards, two vertical transverse lateral cheeks 27, to which the connecting rods 19, 20 of the mechanical means 5 of support and guidance are linked, the kitchen unit 1 resting on the substructure 17, in the high internal position, by means of its cheeks 27.

Figure 4:
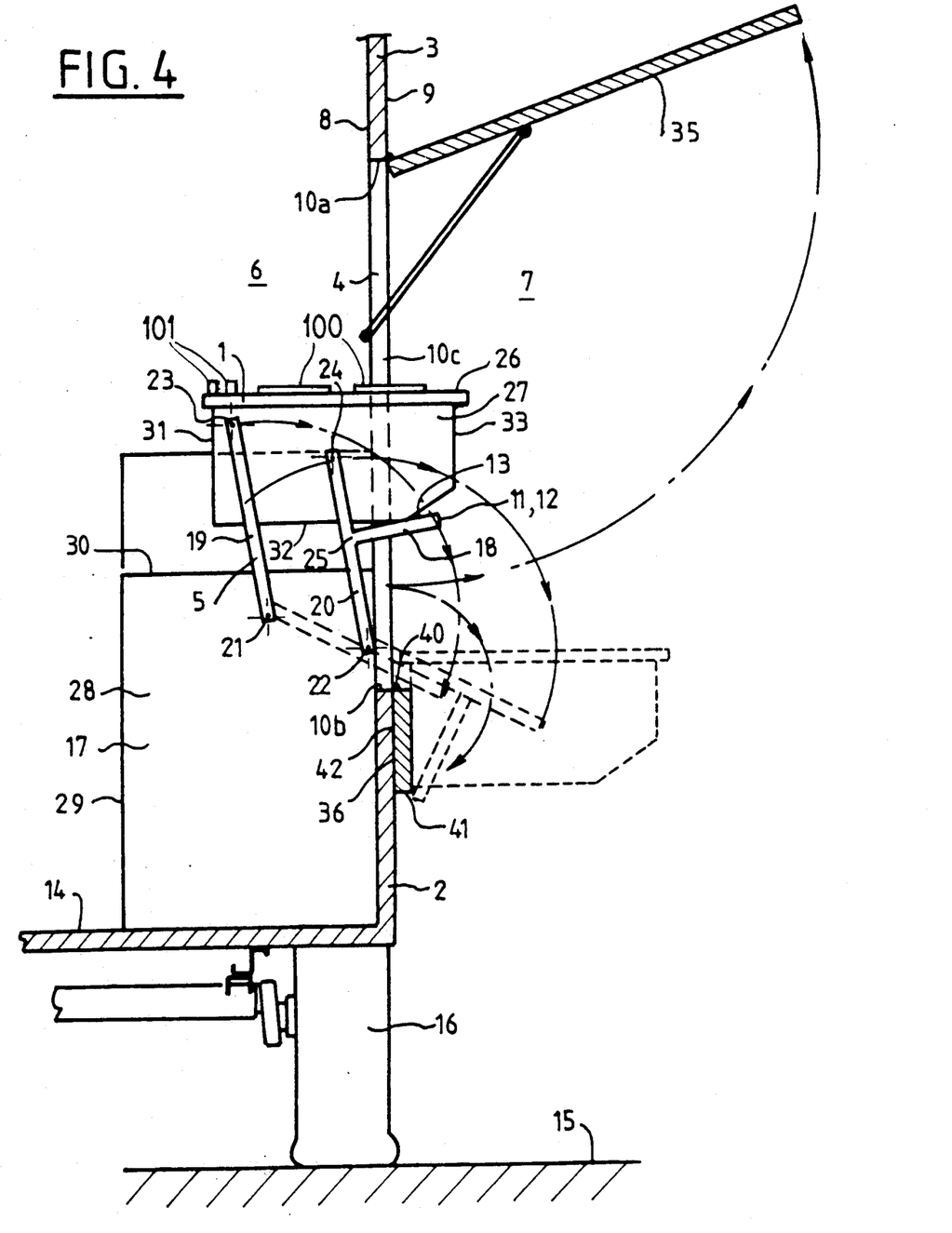
FIG. 4 is a view of the same type as those in FIGS. 1 to 3 which illustrates the movements of the movable elements of the arrangement, the piece of furniture being in an intermediate position and the opening of the partition completely open.
Figure 5:
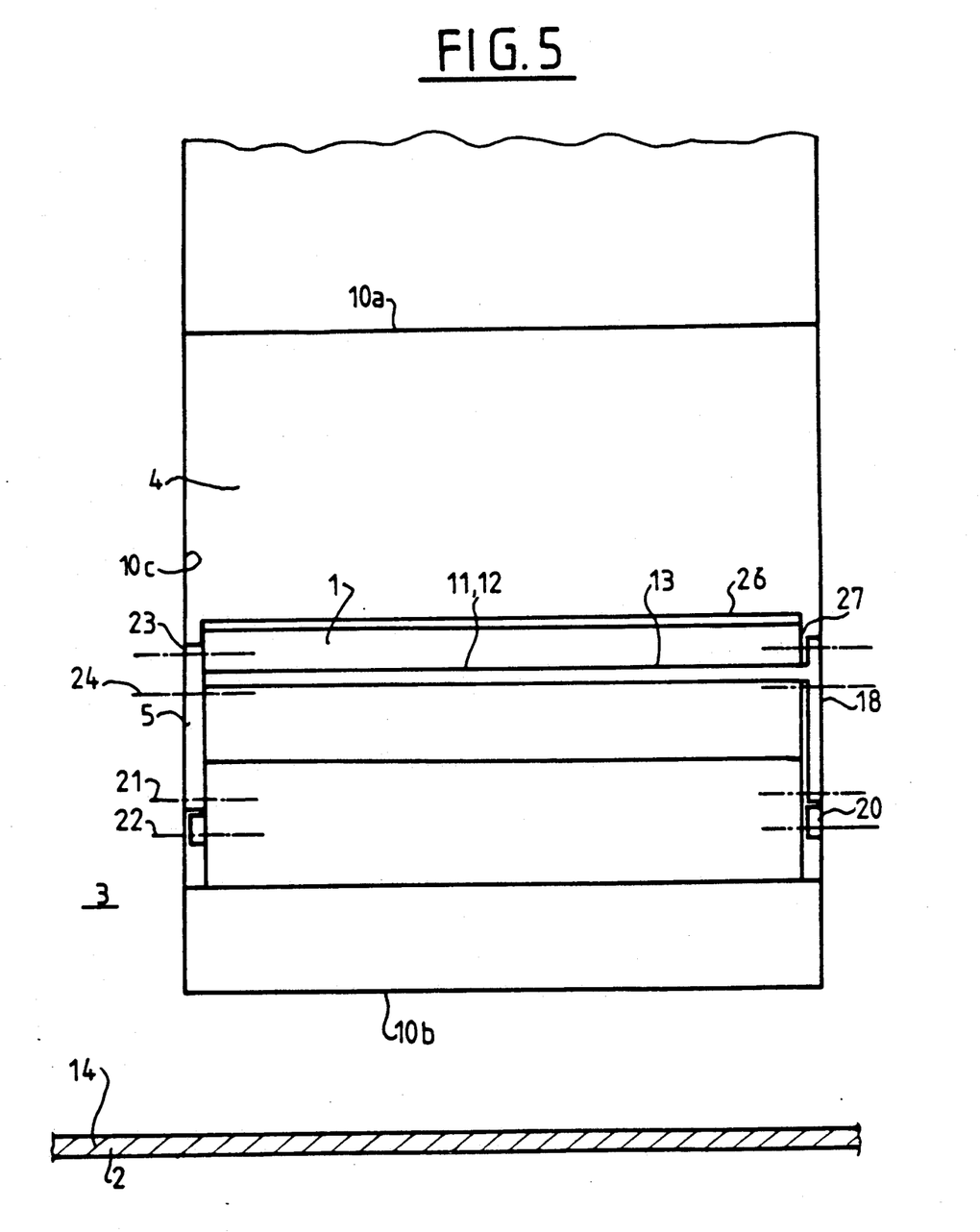
FIG. 5 is a partial longitudinal schematic view, in a vertical plane, along the line V—V of FIG. 1.

For example, the kitchen unit 1 comprises, incorporated in the upper surface 26, kitchen equipment such as a sink 99 (FIG. 3), or one or more cooking plates 100 (FIG. 4). The switches or control knobs 101 of the cooking plate or plates are located on the upper surface 26, the effect of which is that they are accessible in both one and the other of the the two extreme positions of the piece of furniture 1. The fluidic connections of the kitchen equipment such as those for water, gas, and electricity, are either permanent and comprise deformable elements or arranged in a movable manner.

The upper surface 26 bears substantially against the partition 3 in the high internal and the low external positions, on its internal face 8 and its external face 9, respectively.

The piece of furniture or substructure 17 is in the general form of a box with a general parallelepipedal shape positioned against the partition 3 and on the floor 14, and is delimited by two vertical transverse lateral walls 28, which are coplanar with the cheeks 27 and to which the connecting rods 19, 20 of the mechanical means 5 of support and guidance are linked. The substructure is also limited by a vertical and longitudinal front wall 29 and an upper horizontal wall 30. The substructure 17 can also comprise kitchen equipment, such as in particular a refrigerator, oven, cupboard, etc. The upper horizontal wall 30 is intended to serve as a support for the piece of furniture 1 in the high internal position. In this high internal position, the piece of furniture 1 and the substructure are piled up in the form of a column, the cheeks 27 and the walls 28 being coplanar or substantially coplanar, as are the vertical front cants 31 of the surface 26 and of the lateral cheeks 27. The lower cants 32 of the lateral cheeks 27 are, in this high internal position, supported against the upper horizontal wall 30. The front wall 29 and the front cants 31 are parallel and separated from the partition 3.

The vertical rear cants 33, which are parallel to, opposite to, and set towards the rear in relation to the vertical front cants 31 in relation to a user located in a normal use position in front of the piece of furniture 1, are, in the high internal position of the piece of furniture 1, separated from the partition 3, making between them an empty space 34, in which the handle 12 is positioned.

According to the invention, the movement of the kitchen unit 1 from one to the other of its high and low positions is carried out by a user manipulating the handle 12 and being in the external space 7, for example standing on the ground 15. Consequently, it is not indispensable to have access to the handle 12 and to the empty space 34 above, from the internal space 6, when the kitchen unit 1 is in the high position. Also, the upper surface 26 can project towards the rear in relation to the vertical rear cants 33 until it bears against or is immediately next to the partition 3.

The axis 21 is situated, for example, at an equal distance from the front wall 29 and from the partition 3 and close to the upper horizontal wall 30. The axis 23 is situated, for example, close to the angle or corner formed by the upper surface 26 and the vertical front cants 31. The axis 24 is situated, for example, substantially in the centre of the lateral cheeks 27 substantially at an equal distance from the cants 31, 33 on the one hand and from the surface 26 and the cants 32.

The opening 4 is delimited by two horizontal edges, an upper 10a and a lower 10b, and two vertical edges 10c. The upper horizontal edge 10a is preferably positioned sufficiently high—that is to say with sufficient spacing from the upper surface 26 of the kitchen unit 1 in the high position—for the reasons explained below. The lower horizontal edge 10b is positioned, for example, below the lowest of the axes 21 to 24, namely the lower rear axis 22, in particular slightly below the level of the axis 22 in a downward direction (that is to say towards the ground 15) and an outward direction (that is to say towards the external space 7) of the rear connecting rod 20, from the axis 22, when the connecting rod 20 is in the position in which the piece of furniture 1 is in the high internal position. The edges 10c are close, horizontally opposite, to the cheeks 27 and walls 28 as well as the connecting rods 19, 20 which are close to them, in such a manner that the piece of furniture 1 and the means 5 can pass through the opening 4 with the necessary clearance.

In the low external position, the piece of furniture 1 rests against the partition 3 by its front cants 31. Thus, for a user positioned successively in the internal space 6 and the external space 7 with the piece of furniture 1 situated in the space in which the user is located, the front of the piece of furniture 1 becomes the rear and conversely the rear becomes the front. It is for this reason that the piece of furniture 1 is arranged conveniently to allow this transformation (in particular for the upper position of the control switches).

In the low external position, the rear connecting rods 20 are supported on the front connecting rods 19. More specifically, the rear connecting rod 20 is positioned above and on the front connecting rod 19, the branches 18 of the U-shaped frame 13 being directed from top to bottom and from the outside towards the inside. In this position, the connecting rods 19, 20 are inclined from the inside towards the outside and from top to bottom at approximately 20° to 30° to the horizontal, the lower horizontal edge 10b being positioned below the part of the connecting rods 19, 20 which passes through the opening 4, in order to avoid any undesirable collision.

In this low position, the handle 12 is situated close to the partition 3, on the side of its external face 9 and close to the cants 32, in an area where it is consequently not in the way and practically invisible, whilst being able to be grasped in order for the piece of furniture 1 to pass from its low position to its high position, between the two cheeks 27 where there is a free space.

If necessary (not shown), in the low external position, the handle 12 forming the central part of the U-shaped frame 13 is held by a support fixed to the partition 3. Additionally, this support may comprise an anti-return locking device or a security closing device.

Thus, in the low position, the kitchen unit 1 is supported by its cheeks 27 and its front cants 31 against the partition 3, the rigidity, the hold and the stability of the whole being assured by this support as well as, if necessary, the support of the rear connecting rod 20 on the front connecting rod and the support or the locking respectively of the handle 12 on the support provided to this end. Consequently, it is not indispensable to provide a special underframe to support the kitchen unit 1 on the ground 15.

According to a possible variant, the opening 4 is permanent.

According to another possible and preferred variant, the opening 4 is temporary, capable of being sealed by at least one movable flap between two extreme positions of opening and closing respectively, in which the opening 4 is open and closed, a retaining or locking device ensuring that the flap is held in the desired extreme position. Gripping means, such as a handle or equivalent, are provided for manipulating the flap. Means of support and guidance of the flap are also provided, such as a slide, hinge, or other according to whether the flap is moved by sliding (in particular vertical) or pivoting (in particular about a horizontal axis).

Preferably, two flaps, a high flap 35 and a low flap 36 respectively, are provided, which are independent of one another and coplanar in a closed position. These two flaps have, for example, a general shape which is substantially plane and rectangular, delimited in the case of the high flap 35 by the upper horizontal edge 37, lower horizontal edge 38, and lateral edge 39, and in the case of the low flap 36 by the lower horizontal edge 40, horizontal edge 41, and lateral edge 42.

The high flap 35 is mounted articulated by its upper horizontal edge 37 to the partition 3, in particular to the edge 10a of the opening 4, and is movable in the external space 7 between a closed position, in which it is vertical and directed downwards, and an open position, in which it leaves the opening 4, which it is intended to seal, free. In the open position, the high flap 35 is positioned substantially horizontally in the external space 4, fulfilling the function of a canopy and is held by means of props or equivalent 43. Preferably, the high flap 35, in the open position, is slightly inclined from bottom to top, from its edge 37 adjoining the partition 3 to its opposite free edge 38. The prop 43 can be of the type articulated to the flap 35 on at least one of its edges 39 and to the partition on its corresponding edge 10c. The average height of the high flap 35 in the open position makes it possible for the user on the ground 15 to be positioned underneath in order to use the kitchen unit 1. Furthermore, the rather high position of the edge 10a and of the edge 37 produces an opening 4 which is rather high above the kitchen unit 1 and the substructure 17, which can impart to this opening 4 a function of hatch or window with canopy.

The low flap 36 is mounted articulated by its lower horizontal edge 40 to the partition 3, in particular to the edge 10b of the opening 4, and is movable in the external space 7 between a closed position, in which it is vertical and directed upwards, and an open position, in which it is vertical and directed downwards. More specifically, in the open position, the low flap 36 is positioned against the external face 9 of the partition 3, interposed between the latter and the piece of furniture 1.

As results from the figures, the lower edge 10b of the opening 4 is positioned at a lower level and close to the upper surface 26 of the piece of furniture 1 in the low external position. Furthermore, the high flap 35 and the low flap 36 have respective heights such that, in the closed position, their free contiguous edges 38, 41 are situated adjacent above the upper surface 26 of the piece of furniture 1, in the low position, in particular at least substantially coplanar with the upper horizontal wall 30 of the substructure 17, in such a manner that, if the piece of furniture 1 is in the low external position, the high flap 35 can be brought into the closed position without interfering with the piece of furniture 1 or the connecting rods 19, 20, while substantially closing the opening 4 of the partition 3. To this end, the high flap 35 is a large flap and the low flap 36 is a small flap, the latter having, for example, a height in the region of the height of the piece of furniture 1.

The flaps 35, 36 are, for example, comparable to the partition 3 from which they are cut out.

The invention can be the subject of variants, improvements etc. For example, it can be provided with uni- or bidirectional assistance elements, such as jacks or endless screws, autonomous or operated manually or by means of a motor, which are capable of facilitating the movement of the movable elements.

The function of the vehicle which has just been described is the following.

Figure 1:
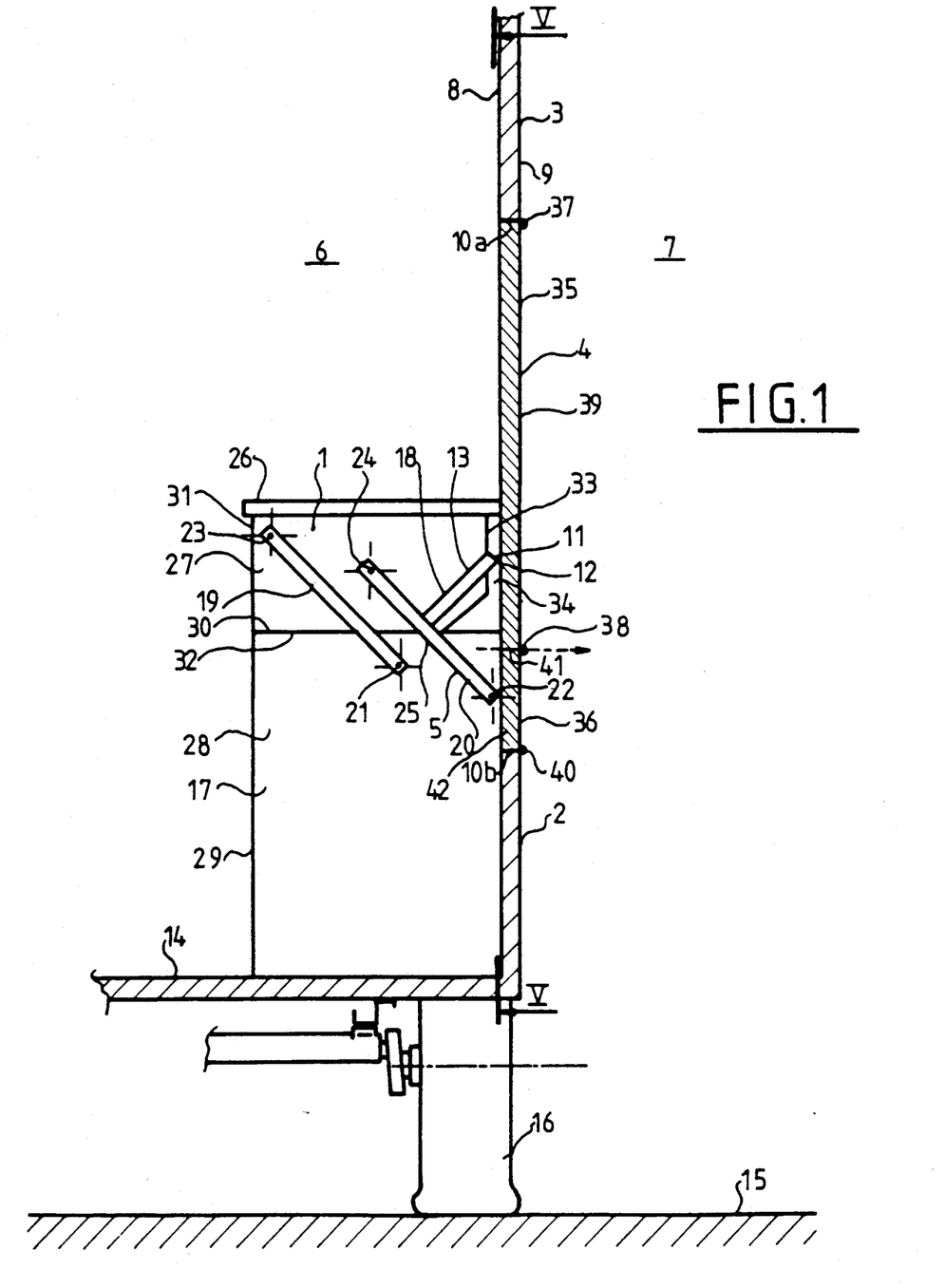
FIG. 1 is a partial transverse schematic view, in a vertical plane, of a caravan arranged according to the invention, with the piece of furniture in a high internal position and the opening of the partition completely closed.

Initially (FIG. 1), the kitchen unit 1 is in the high internal position, in which it rests on the substructure 17. The opening 4 is closed, the flaps 35 and 36 being in the closed position, in particular locked. A user can use the kitchen unit 1 normally in the internal space 6, standing on the floor 14, the kitchen unit 1 being at a convenient height for use.

Then (FIG. 4), the flaps 35, 36 are attached in the open position, by pivoting about their respective edges 37, 40 by manual, motorized, or assisted action. It follows that the opening 4 is then open. In this situation, a user can gain access, from the external space 7, to the handle 12 and manipulate it in order to make the kitchen unit pass from its high position to its low position.

Figure 2:
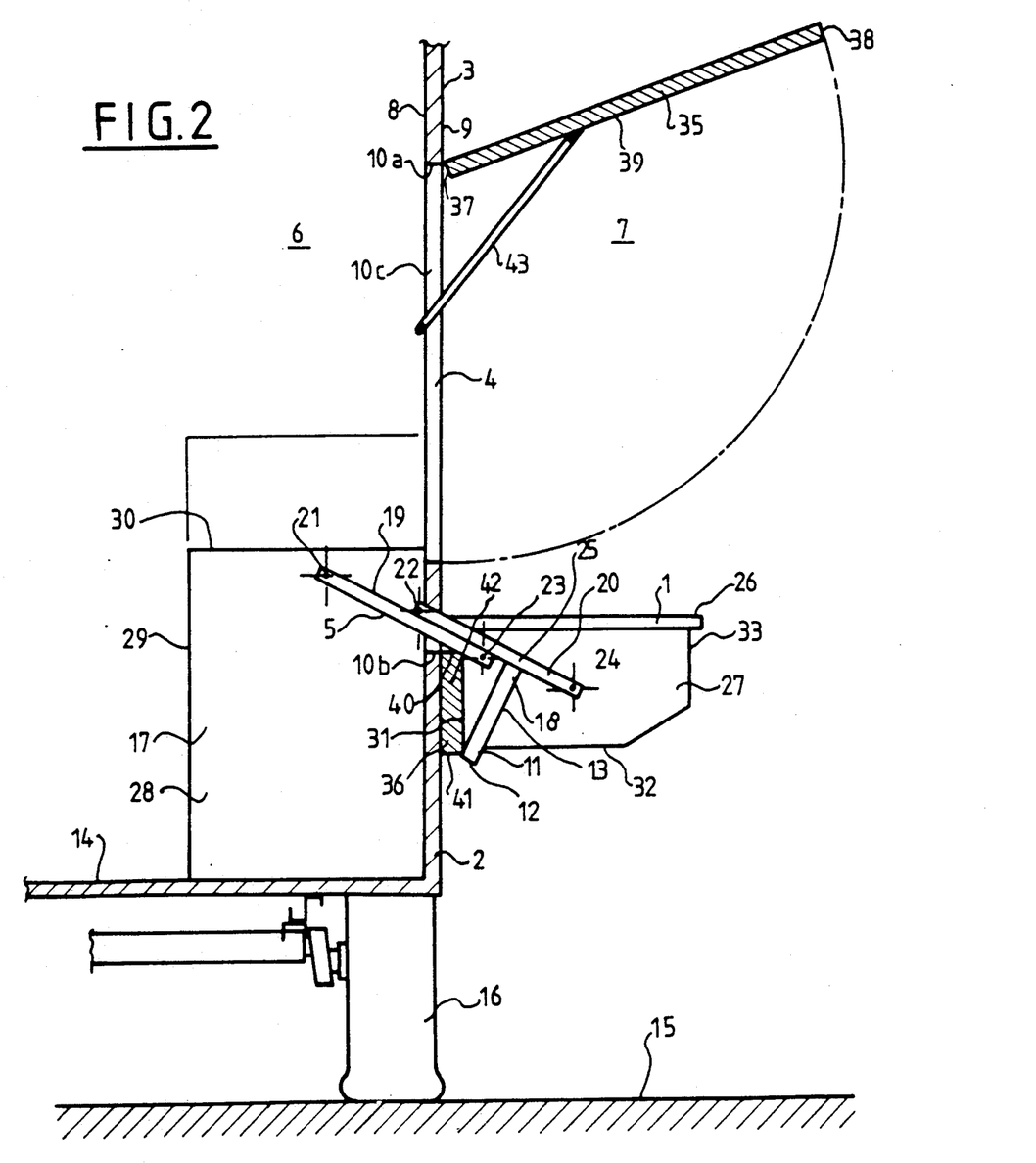
FIG. 2 is a view of the same type as that in FIG. 1 with the piece of furniture in a low external position and the opening of the partition completely open.

In the low position (FIG. 2), the kitchen unit 1 rests as has already been indicated, in particular on the low flap 36, and it is in a convenient position for use for a user standing on the ground 15.

It is then possible to substantially seal the opening 4 (FIG. 3) by bringing the high flap 35 into the closed position, the low flap 36 remaining in the open position. The opening 4 is then virtually completely masked by either the flap 35 in the closed position, the piece of furniture 1, or the substructure 17. This situation is used at night for example. In this situation, the kitchen unit 1 can still be used.

We claim:

1. An arrangement for a piece of furniture in a vehicle having a floor being supported by wheels resting on a ground surface, which surface forms a low external support area, said floor being a high internal support area with a height (H) above said low external support area, said vehicle being at least one essentially vertical partition with an opening for the piece of furniture to pass through, said piece of furniture being in either of two extreme positions situated close to said partition, one position of said two extreme positions being on one side of the partition and a second position of said two extreme positions being on another side of the partition and offset below the one position, an upper flap being attached to an upper edge of the opening and a lower flap being attached to a lower edge of the opening, said upper and lower flaps being movable from a first position closing the opening to another position out of said opening and said upper flap being of a size to move to the closed first position with the piece in the second position, mechanical means for support the guidance of the piece of furniture in said two positions, said two extreme positions having a vertical spacing (H) therebetween substantially equal to or close to said height (H) so that the piece of furniture in each of the two extreme positions is at a same height for a user.

2. A vehicle, in particular serving as a habitation, such as a caravan, camping vehicle, mobile home, truck or trailer used as a shop or equivalent, fixed or movable, said habitation comprising a partition (3) and a floor (14) which is raised in relation to a ground surface (15) and supported by supports (16), such as wheels, props or equivalent means, the habitation being provided with a functional furniture arrangement comprising in general a plurality of pieces of furniture of which at lease one piece (1), or part of the one piece, is in either of two extreme positions, of which one position is a high internal use position close to the essentially vertical partition (3), and can be moved from the one position to another position of said two extreme positions, while remaining constantly at least substantially in a relative horizontal position, and mechanical means (5) for support and guidance, the two extreme positions of the piece of furniture (1) are the high internal position for use and a low external position also for use, which low external position is close to the partition (3) and on an opposite side of the partition from the high internal position, the two positions being offset in relation to one another in a vertical direction with a spacing (H) which is substantially equal to or close to a height (H) of the floor (14) in-relation to the ground surface (15); the partition (3) having an opening (4) for the piece of furniture (1) to pass through from one to the other of the extreme positions; so that the piece of furniture (1) can be used from the inside or the outside of the vehicle (2), according to whether it is in the high internal position or the low external position, respectively, while being at a substantially equal relative height of use for a user in both cases.

3. The vehicle as claimed in claim 2, wherein the piece of furniture (1) is a kitchen unit or part of the kitchen unit.

4. The vehicle as claimed in claim 2, wherein the mechanical means (5) for support and guidance comprise at least one connecting rod (19, 20) articulated to a substructure (17) fixed to the partition (3), and articulated to the piece of furniture (1), about axes which are at least substantially horizontal.

5. The vehicle as claimed in claim 2, wherein the mechanical means (5) for support and guidance comprise at least two connecting rods (19, 20) consituting a deformable parallelogram (21, 22, 23, 24).

6. The vehicle as claimed in claim 2, wherein the mechanical means (5) for support and guidance comprise at least one pair of connecting rods which are separated transversely from one another along common axes of articulation.

7. The vehicle according to claim 2, which also includes manual means for gripping the one piece, said manual means including a handle (12) formed by a central part of a U-shaped frame (13) having two branches (18) which are fixed rigidly to two connecting rods of the mechanical means (5) so that an actuation force to move the one piece can be applied.

8. The vehicle as claimed in claim 7, wherein the mechanical means for support and guidance and the manual gripping means comprise two front connecting rods (19), which are separated transversely from one another, and two rear connecting rods (20), which are separated transversely from one another, which rods are articulated to a substructure (17) about lower front axes (21) and lower rear axes (22) respectively and to the piece of furniture (1) about upper front axes (23) and upper rear axes (24), the axes (22, 21, 23, 24) constituting a deformable parallelogram; the lower front axes (21) being positioned at a higher level than the lower rear axes (22); the lower rear axes (22) being situated immediately next to the partition (3); the connecting rods (19, 20) being inclined at approximately 45° in the extreme positions of the piece of furniture (1); the U-shaped frame (13) being fixed by said branches (18) to the rear connecting rods (20), substantially perpendicularly to the rear connecting rods and substantially in the centre of the rear connecting rods, the handle (12) forming the central part of the U-shaped frame (13), in the high internal position of the piece of furniture (1) being situated close to the partition (3), behind and close to the piece of furniture (1), at least substantially at a level of the upper rear axes (24), and in the low external position of the piece of furniture (1) being situated close to the partition (3), below and close to the piece of furniture (1).

9. The vehicle as claimed in claim 2, wherein the piece of furniture (1), which forms a kitchen unit which has a general parallelepipedal and relatively flat shape, comprises an upper surface (26) and, rigidly fixed and directed downwards, two vertical transverse lateral cheeks (27), to which connecting rods (19, 20) of the mechanical means (5) are linked, the kitchen unit (1) resting on a substructure (17), in the high internal position, by means of the cheeks (27).

10. The vehicle as claimed in claim 9, wherein the kitchen unit (1) comprises, incorporated in the upper surface (26), kitchen equipment such as a sink, or one or more cooking plates.

11. The vehicle as claimed in claim 10, wherein switches or control knobs of the cooking plate or plates are located on the upper surface (26), the effect of which is that they are accessible in both one and the other of the two extreme positions of the piece of furniture (1).

12. The vehicle according to claim 2, wherein an upper surface (26) of the piece bears substantially against an internal face of the partition in the high internal position and against an external face of the partition when in the low external position.

13. The vehicle as claimed in claim 2, wherein a substructure (17) is in a general form of a box with a general parallelepipedal shape positioned against the partition (3) and on the floor (14), and is delimited by two vertical transverse lateral walls (28), which are coplanar with cheeks (27) of the piece and the mechanical means (5) for support and guidance has front and rear connecting rods linking the cheeks to the lateral walls.

14. The vehicle as claimed in claim 13, wherein in the low external position, the piece of furniture (1) has front edges resting against the partition (3).

15. The vehicle as claimed in claim 14, wherein in the low external position, the rear connecting rods (20) are supported on the front connecting rods (19).

16. The vehicle as claimed in claim 14, wherein in the low external position, a handle (12) forming a central part of a U-shaped frame (13) is held by a support fixed to the partition (3).

17. The vehicle as claimed in claim 2, wherein the opening (4) of the partition (3) is either permanent, or temporary, capable of being sealed by at least one movable flap.

18. The vehicle as claimed in claim 17, which comprises a high flap (35) and a low flap (36), which are indenpendent of one another and coplanar in a closed position.

19. The vehicle as claimed in claim 18, wherein the high flap (35) and the low flap (36) have respective heights such that, in the closed position, free contiguous edges (38, 41) of the flaps are situated adjacent above an upper surface (26) of the piece of furniture (1), in the low external position, and are at least substantially coplanar with an upper horizontal wall (30) of a substructure (17), in such a manner that, if the piece of furniture (1) is in the low external position, the high flap (35) can be brought into the closed position without interfering with the piece of furniture (1) and any connecting rods (19, 20) of the mechanical means, while substantially closing the opening (4) of the partition (3).

20. The vehicle as claimed in claim 17, wherein a high flap (35) is mounted articulated by its upper horizontal edge (37) to the partition (3) at an edge (10a) of the opening (4), and is movable in an external space (7) between a closed position, in which it is vertical and directed downwards, and an open position, in which it leaves the opening (4), which it is intended to seal, free.

21. The vehicle as claimed in claim 20, wherein in the open position, the high flap (35) is positioned substantially horizontally in the external space (7), fulfilling the function of a canopy and is held by means of props or equivalent (43).

22. The vehicle as claimed in claim 17, wherein a low flap (36) is mounted articulated by a lower horizontal edge (40) to the partition (3), at an edge (10b) of the opening (4), and is movable in an external space (7) between a closed position, in which it is vertical and directed upwards, and an open position, in which it is vertical and directed downwards.

23. The vehicle as claimed in claim 22, wherein the open position, the low flap (36) is positioned against an external face (9) of the partition (3), interposed between the partition and the piece of furniture (1).

24. The vehicle as claimed in claim 22, wherein the lower edge (10b) of the opening (4) is positioned at a lower level and close to an upper surface (26) of the piece of furniture (1) in the low external position.

* * * * *